US009746387B2

(12) United States Patent
Yang et al.

(10) Patent No.: US 9,746,387 B2
(45) Date of Patent: Aug. 29, 2017

(54) MACHINE ARRANGEMENT

(71) Applicant: AKTIEBOLAGET SKF, Göteborg (SE)

(72) Inventors: Hongyu Yang, Houten (NL); John F. van de Sanden, Nieuwegein (NL); Hendrik Anne Mol, Sleeuwijk (NL)

(73) Assignee: AKTIEBOLAGET SKF, Gothenburg (SE)

( * ) Notice: Subject to any disclaimer, the term of this patent is extended or adjusted under 35 U.S.C. 154(b) by 58 days.

(21) Appl. No.: 14/406,948

(22) PCT Filed: Jun. 12, 2013

(86) PCT No.: PCT/EP2013/062145
§ 371 (c)(1),
(2) Date: Dec. 10, 2014

(87) PCT Pub. No.: WO2013/186258
PCT Pub. Date: Dec. 19, 2013

(65) Prior Publication Data
US 2015/0292966 A1 Oct. 15, 2015

(30) Foreign Application Priority Data
Jun. 15, 2012 (WO) ............... PCT/EP2012/061407

(51) Int. Cl.
F16C 41/00 (2006.01)
G01L 1/24 (2006.01)
(Continued)

(52) U.S. Cl.
CPC ............ *G01L 1/246* (2013.01); *C03C 27/044* (2013.01); *F16C 19/52* (2013.01); *F16C 33/586* (2013.01);
(Continued)

(58) Field of Classification Search
CPC ........ G01L 1/246; G01L 5/0009; F16C 41/00; F16C 33/586; F16C 2233/00;
(Continued)

(56) References Cited

U.S. PATENT DOCUMENTS 4,768,859 A * 9/1988 Kasori ............... C03C 13/046
385/144
5,500,917 A * 3/1996 Daniel ................ C03C 27/06
385/43
6,080,982 A * 6/2000 Cohen ................ F16C 17/246
250/227.11
(Continued)

FOREIGN PATENT DOCUMENTS

JP S6369734 A 3/1988
NL WO 2011066926 A1 * 6/2011 ......... G01D 5/35303

*Primary Examiner* — Alan B Waits
(74) *Attorney, Agent, or Firm* — Bryan Peckjian; SKF USA Inc. Patent Dept.

(57) ABSTRACT

A machine arrangement, including at least one bearing ring, wherein a glass fiber is connected with the machine arrangement. To allow a proper measurement of stresses, even at curved surfaces of the machine arrangement as it is typical in the case of bearing rings, the connection between the glass fiber and the machine arrangement is established by a glass material. The glass material is connected by material bonding with the machine arrangement as well as with the glass fiber.

6 Claims, 2 Drawing Sheets

(51) Int. Cl.
  *C03C 27/04* (2006.01)
  *G01M 11/08* (2006.01)
  *G01M 13/04* (2006.01)
  *G01L 5/00* (2006.01)
  *F16C 19/52* (2006.01)
  *F16C 33/58* (2006.01)

(52) U.S. Cl.
  CPC ............ *F16C 41/00* (2013.01); *G01L 5/0009* (2013.01); *G01M 11/086* (2013.01); *G01M 13/04* (2013.01); *F16C 2226/36* (2013.01); *F16C 2233/00* (2013.01)

(58) Field of Classification Search
  CPC ................ F16C 2226/36; F16C 19/52; G01M 11/083–11/085; G01M 11/086; G01M 13/04; C03C 27/044
  See application file for complete search history.

(56) References Cited

U.S. PATENT DOCUMENTS

| | | | | |
|---|---|---|---|---|
| 6,766,697 | B1* | 7/2004 | Perez | F16C 17/03 73/760 |
| 8,100,586 | B2* | 1/2012 | Ruggiero | F16C 17/024 384/103 |
| 8,790,013 | B2* | 7/2014 | Reedman | G01D 5/35303 384/448 |
| 9,297,738 | B2* | 3/2016 | Strandell | G01N 15/0826 |
| 2002/0118908 | A1* | 8/2002 | Conde | C03C 27/044 385/14 |
| 2007/0177162 | A1* | 8/2007 | Glueck | F16C 19/522 356/621 |
| 2010/0158434 | A1* | 6/2010 | Becker | G01B 11/18 385/13 |
| 2015/0323013 | A1* | 11/2015 | Herdier | F16C 19/522 384/448 |

\* cited by examiner

MACHINE ARRANGEMENT

CROSS REFERENCE TO RELATED APPLICATIONS

This is a National Stage Application claiming the benefit of International Application Number PCT/EP2013/062145 filed on 12 Jun. 2013, which claims the benefit of European Patent Application Serial Number PCT/EP2012/061407 filed on 15 Jun. 2012, both of which are incorporated herein by reference in their entireties.

TECHNICAL FIELD

The invention relates to a machine arrangement, comprising or being at least one bearing ring, wherein a glass fiber is connected with the machine arrangement.

BACKGROUND

It is known in the art to equip a machine part of this kind with a glass fiber element to allow the measurement of different physical parameters. By doing so, a survey of the parameters becomes possible by using the fiber Bragg grating (FBG) method. By this method temperatures as well as strains of the machine arrangement can be monitored. An example of an arrangement of the generic kind is disclosed in US 2010/0158434 A1.

For doing so it is necessary to connect a glass fiber with the component. For surveying temperatures it is essential that a thermal coupling between the glass fiber and the machine arrangement is established. For monitoring strains it is necessary to mechanically connect the glass fiber with the component to be monitored.

Specifically in the latter case problems arise because the glass fiber is normally equipped with a plurality of coaxially arranged cover layers. A typical construction employs a cladding arranged around the glass fiber (core) itself; the cladding is coated by a coating layer. Then, strengthening fibers (made e.g. from aramid) are arranged at the outer circumference of the coating. Finally the strengthening fibers are cased by a hollow cylindrical cable jacket.

When a glass fiber element of this type is connected with the component a certain elasticity is immanent between the glass core and the component. Thus, specifically the measurement of strains is problematic due to the elasticity. This is specifically a problem when the component is not even or flat but if it has a spherical shape. This is typical in the case of a part of a bearing, specifically of a roller bearing.

US 2002/0118908 A1 shows the connection of an axial end of a glass fiber with substrate by means of glass material.

It is an object of the present invention to propose a machine arrangement of the above mentioned kind which is designed in such a manner that a contact is established between the glass fiber core and the component which is as stiff as possible. By doing so it is aimed to monitor physical properties, especially of strains in the component, with a high degree of precision. Thus, specifically a proper measurement of stresses should become possible even at curved surfaces of the machine arrangement as it is typical in the case of bearing rings.

SUMMARY OF THE INVENTION

A solution according to the invention is characterized in that the connection between the glass fiber and the machine arrangement is established by a glass material which glass material is connected by material bonding with the machine arrangement as well as with the glass fiber, wherein the glass fiber is connected with the machine arrangement by encasing the whole circumference of the glass fiber with the glass material along at least a part of the longitudinal axis of the glass fiber.

The glass fiber is basically free from any layer as described above. An exception can be that the glass fiber is encased by a reflective cover material to ensure the conduction of light through the glass fiber. Here, a specific solution suggests that the reflective cover material is a second glass material, wherein the refractive index of the glass fiber is different from the refractive index of the second glass material. Insofar, the glass fiber has then some kind of cladding to keep that light in the glass fiber. This cladding is then fused to the substrate.

The material bonded connection between the glass material and the machine arrangement can be established by a welding process using the glass material.

The material bonded connection between the glass material and the glass fiber can also be established by a welding or melting process using the glass material.

The glass material can have at least partially a thickness measured in the direction perpendicular to the longitudinal axis of the glass fiber of at least 0.3 mm, preferably of at least 0.5 mm.

The glass fiber can be arranged on a curved surface of the machine arrangement, especially on a cylindrical surface of a bearing ring.

Thereby, the glass fiber can be attached to a cylindrical surface of the machine arrangement. Also, it is possible to locate the glass fiber in a groove which is machined for the glass fiber into the machine arrangement.

By the proposed design a stiff and direct connection is established between the glass fiber and the component to be monitored so that physical parameters—especially temperatures and strains—can be detected in a precise way.

BRIEF DESCRIPTION OF THE DRAWINGS

The drawings show an embodiment of the invention.

DETAILED DESCRIPTION OF THE INVENTION

Figure 1:
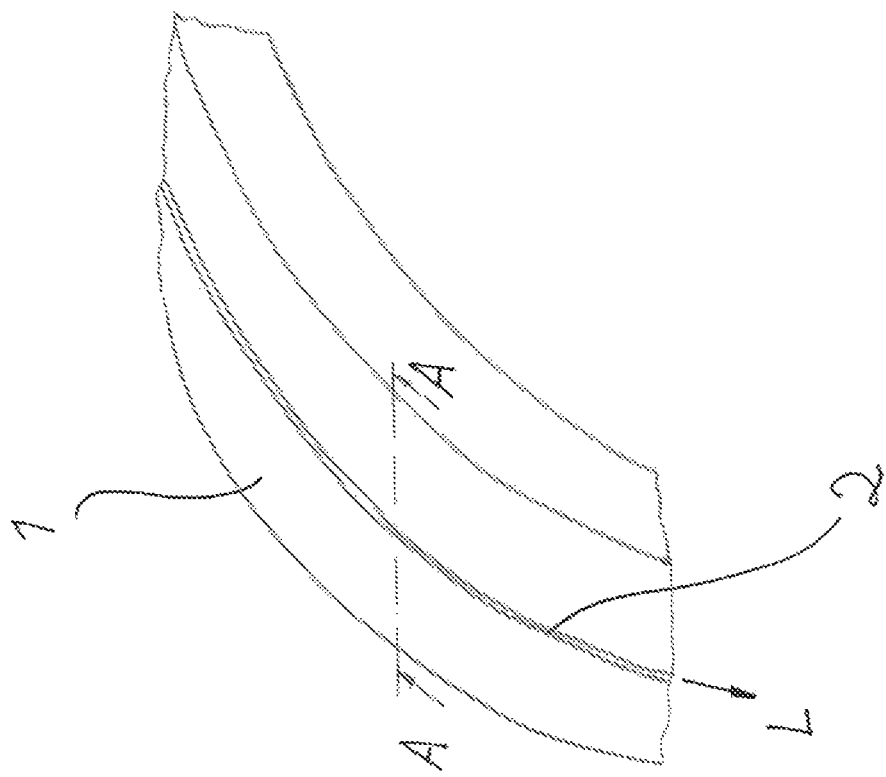
FIG. 1 shows in a perspective view a section of a outer bearing ring of a roller bearing, on which a glass fiber is fixed

In FIG. 1 a machine arrangement 1 being an outer bearing ring of a roller bearing is shown. The bearing ring 1 has an outer spherical surface which is to be monitored with respect to strains which act in the machine part. The survey of those strains is carried out by the fiber Bragg grating (FBG) method which is known as such. Reference is made e.g. to U.S. Pat. No. 6,923,048 B2 where this technology is explained in more detail.

For doing so a glass fiber 2 is securely fixed on the spherical, i.e. cylindrical outer circumference of the bearing ring 1. The glass fiber 2 has a longitudinal direction L which extends in the circumferential direction of the bearing ring 1.

Figure 2:
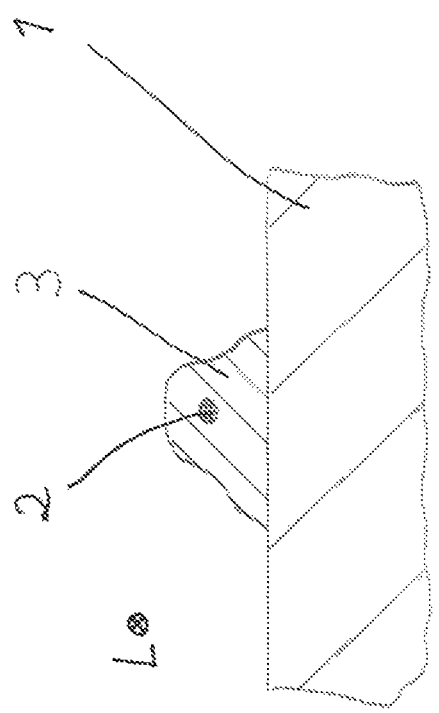
FIG. 2 shows the cross section A-A according to FIG. 1.

Details concerning the fixation of the glass fiber 2 at the bearing ring 1 can be seen from FIG. 2.

Here, it can be seen that the glass fiber 2 is basically the pure glass element—possibly covered only by a reflective coating to ensure proper light conduction within the glass fiber—which is then connected with the bearing ring 2 by means of glass material 3.

Thus, a material bonding is established between the glass fiber 2 and the machine part 1 to be monitored. This means, all strains in the machine part 1 are directly transferred into the glass fiber 2. Thus, the precondition is assured for a precise measurement of physical parameters of the machine part 1.

REFERENCE NUMERALS

1 Machine arrangement (bearing ring)
2 Glass fiber
3 Glass material
L Longitudinal axis

The invention claimed is:

1. A machine arrangement, comprising or being at least one bearing ring formed of a metal, wherein a glass fiber is connected with the machine arrangement,
   wherein the connection between the glass fiber and the machine arrangement is established by a glass material wherein the glass material is connected by material bonding with the at least one bearing ring formed of the metal as well as with the glass fiber, the glass material being the only material between the glass fiber and the at least one bearing ring such that there is no non-glass material between the glass fiber and the at least one bearing ring,
   wherein the glass fiber is connected with the machine arrangement by encasing the whole circumference of the glass fiber with the glass material along at least a part of the longitudinal axis of the glass fiber,
   and wherein the glass fiber is not located within a groove of the at least one bearing ring such that the glass fiber is spaced radially from an outer cylindrical surface of the at least one bearing ring.

2. The machine arrangement according to claim 1, wherein the material bonded connection between the glass material and the machine arrangement is established by a welding process using the glass material.

3. The machine arrangement according to claim 1, wherein the material bonded connection between the glass material and the glass fiber is established by a welding or melting process using the glass material.

4. The machine arrangement according to claim 1, wherein the glass material has a thickness measured in the direction perpendicular to the longitudinal axis of the glass fiber of at least 0.3 (zero point three) mm.

5. The machine arrangement according to claim 1, wherein the glass material is materially bonded to the outer cylindrical surface of the at least one bearing ring.

6. The machine arrangement according to claim 1, wherein the glass material has a thickness measured in the direction perpendicular to the longitudinal axis of the glass fiber of at least 0.5 (zero point five) mm.

* * * * *